(12) United States Patent
Chan

(10) Patent No.: US 7,394,370 B2
(45) Date of Patent: Jul. 1, 2008

(54) APPARATUS AND METHOD OF ACQUIRING AND STORING DATA OF CLOSE CONTACTS

(75) Inventor: Wee-Piak Chan, Singapore (SG)

(73) Assignee: Amplus Communication Pte. Ltd., Singapore (SG)

( * ) Notice: Subject to any disclaimer, the term of this patent is extended or adjusted under 35 U.S.C. 154(b) by 254 days.

(21) Appl. No.: 10/556,168

(22) PCT Filed: Jul. 31, 2003

(86) PCT No.: PCT/SG03/00182

§ 371 (c)(1),
(2), (4) Date: Nov. 7, 2005

(87) PCT Pub. No.: WO2004/100061

PCT Pub. Date: Nov. 18, 2004

(65) Prior Publication Data

US 2006/0220879 A1 Oct. 5, 2006

(30) Foreign Application Priority Data

May 6, 2003 (SG) .............................. 200302514-5

(51) Int. Cl.
G08B 13/14 (2006.01)

(52) U.S. Cl. ............... 340/572.1; 340/572.4; 340/572.8; 340/573.1; 340/573.4; 340/10.1; 340/10.3; 340/10.51; 340/539.13; 340/522

(58) Field of Classification Search ............... 340/572.1, 340/572.4, 572.8, 573.1, 573.4, 10.1, 10.3, 340/10.51, 539.13, 522, 572.7
See application file for complete search history.

(56) References Cited

U.S. PATENT DOCUMENTS

| 4,057,790 | A | 11/1977 | Fleming et al. | |
|---|---|---|---|---|
| 4,857,893 | A | 8/1989 | Carroll | |
| 5,814,797 | A | 9/1998 | Rifkin | |
| 6,104,295 | A | 8/2000 | Gaisser et al. | |
| 6,753,782 | B2 * | 6/2004 | Power | 340/573.4 |
| 2002/0125996 | A1 | 9/2002 | Feinberg | |
| 2002/0171534 | A1 | 11/2002 | Ashwin | |
| 2002/0175807 | A1 | 11/2002 | Ashwin | |
| 2003/0058110 | A1 | 3/2003 | Rich | |

FOREIGN PATENT DOCUMENTS

| DE | 3632958 | 11/1987 |
|---|---|---|
| EP | 1184724 | 3/2002 |
| EP | 1184805 | 3/2002 |
| JP | 2002 076967 | 3/2002 |
| WO | WO 99/45500 | 9/1999 |
| WO | WO 03/027947 A1 | 4/2003 |

* cited by examiner

Primary Examiner—Tai Nguyen
(74) Attorney, Agent, or Firm—Blakely, Sokoloff, Taylor & Zafman; Stephen M. De Klerk

(57) ABSTRACT

A method of recording close contacts for disease control, the method including the steps of using a device to transmit identity and date/time of contact details to a similar device for each close contact. Identity details of the similar device are received and store for at least predetermined time for each close contact. At the expiry of the predetermined time the received identity details may be overwritten if the memory is full. The stored identity details are used to determine identities of persons with whom close contact had been made within the predetermined time. The device has embedded therein a semiconductor processor device, a memory device, a clock and a transmitter/receiver with an antenna.

42 Claims, 3 Drawing Sheets

APPARATUS AND METHOD OF ACQUIRING AND STORING DATA OF CLOSE CONTACTS

CROSS-REFERENCE TO OTHER APPLICATIONS

This is a National Phase of International Application No. PCT/SG2003/000182, filed on Jul. 31, 2003, which claims priority from Singaporean Patent Application No. 200302514-5, filed on May 6, 2003.

FIELD OF THE INVENTION

This invention relates to a method and apparatus for acquiring and storing data of close contacts and refers particularly, though not exclusively, to a device with transmitting and receiving functions, and memory, and to a method for acquiring and storing data of close contacts for disease control.

BACKGROUND TO THE INVENTION

Many infectious diseases require relatively close contact for the disease to be transmitted. For example, Severe Acute Respiratory Syndrome ("SARS") is spread through droplets of phlegm from a sneeze or cough. This requires two persons to be reasonably close—within a few meters of each other— for disease transmission.

When a patient is suspected of having a contagious disease requiring close contact for transmission, all those with whom the patient has come into close contact since contracting the disease need to be found to determine if they have also contracted the disease. This is presently conducted by circulating notices, and asking the patient. As the patient may by that stage be quite ill, this ability to recall all close contacts over several days is quite limited. If the patient is elderly, or a child, it will be severally limited. Unintentional close contact can also occur in places such as, for example, a lift where the patient will not know the identity of the persons with whom the lift was shared, or when a person uses a lift that was used by an infected patient within a transmission time of the disease.

SUMMARY OF THE INVENTION

According to one aspect, there is provided a device for use in recording close contact for disease tracking, the device having embedded therein at least one circuit including:
(a) a semiconductor processor device;
(b) a memory device;
(c) a clock;
(d) an identity number; and
(e) a transmitter/receiver with an antenna.

Two or more of the semiconductor processor device, the memory device, the clock and the transmitter/receiver may be integral or separate.

Each item of received data is stamped with a date and time the data was received. The data together with its date and time of receipt may be stored in the memory device for at least a predetermined period of time, the predetermined time being not less than an incubation period of the disease. Preferably, the memory device uses a first-in-first-out logic. Data will preferably not be overwritten until the memory is full. If the stored data contains an entry for a received identity, and the same identity is later recorded, the new date and time stamp may be added to the data already recorded for that identity. If the data is downloaded for processing, the data downloaded may be overwritten. Alternatively, the downloaded data may be deleted from the memory.

The received data may comprise identity details of similar devices that have come into close contact with the device. Close contact may be a distance not greater than the transmitting range of the device, and the distance may be not less than a transmission range of the disease. The duration of the close contact may be determined and stored.

The device may have a built-in battery for providing power to the circuit. It may also have a built-in low battery warning that may be either or both of audio and visual.

In another aspect, there is provided a method of recording close contacts for disease control, the method including the steps:
(a) using a device to transmit identity details to at least one other similar device when the device and the at least one other device come into close contact;
(b) receiving from the at least one other similar device identity details of the at least one other similar device;
(c) recording the date of receipt and time of receipt of the received identity details;
(d) storing in a memory of the device the received identity details, date of receipt and time of receipt; and
(e) downloading and using the stored identity details to determine identities of persons with whom close contact had been made.

Preferably, the memory uses a first-in-first-out logic. After the device has been used for a number of days, the memory will be full and it will stay full. When the memory is full and a new identity detail is received, the new identity detail will be date and time stamped, and the new identity detail with its date and time stamp will overwrite the oldest identity, with its date and time stamp, in the memory.

The device may have embedded therein at least one circuit including:
(a) a semiconductor processor device;
(b) a memory device;
(c) a clock;
(d) the identity; and
(e) a transmitter/receiver with an antenna.

The device may also have a battery for providing power to the circuit.

Close contact may be a distance not less than a transmission range of the disease. The device may have a transmission range not less than the transmission range of the disease.

The duration of the close contact may also be determined and stored. The duration of the close contact may be the time the device and the at least one other device are in transmission range. The duration may be determined by recording the start of the close contact and the end of the close contact, and determining the difference. The duration may be in system clock counts or real time.

The device may be issued to a person on a temporary basis for the duration of a stay of the person in a controlled environment the device being tracked by reference to the identity of the person.

The controlled environment may be one or more of: a hospital, an educational institution, an office building, and a military base. The tracking may be by reference to an identifier of the person or a location. The identifier of the person may be one or more of identity card number, passport number, social security number, and, employment pass number. If by location it may be by one or more of building, annexe, floor number, a room number, and a lift number.

The controlled environment may have at least one reader for downloading the stored identity, and date, time and duration details. The downloading may be by wireless transmission.

A penultimate aspect provides a device for use in performing the method described above.

In a final aspect there is provided a software arrangement that is operable on a processor, comprising a software arrangement computer program code that configures the processor to perform one or more functions as described above.

DESCRIPTION OF THE DRAWINGS

In order that the invention may be readily understood and put into practical effect, there shall now be described by way of non-limitative example only preferred embodiments of the present invention, the description being with reference to the accompanying illustrative drawings, in which.

DESCRIPTION OF PREFERRED EMBODIMENTS

Figure 1:
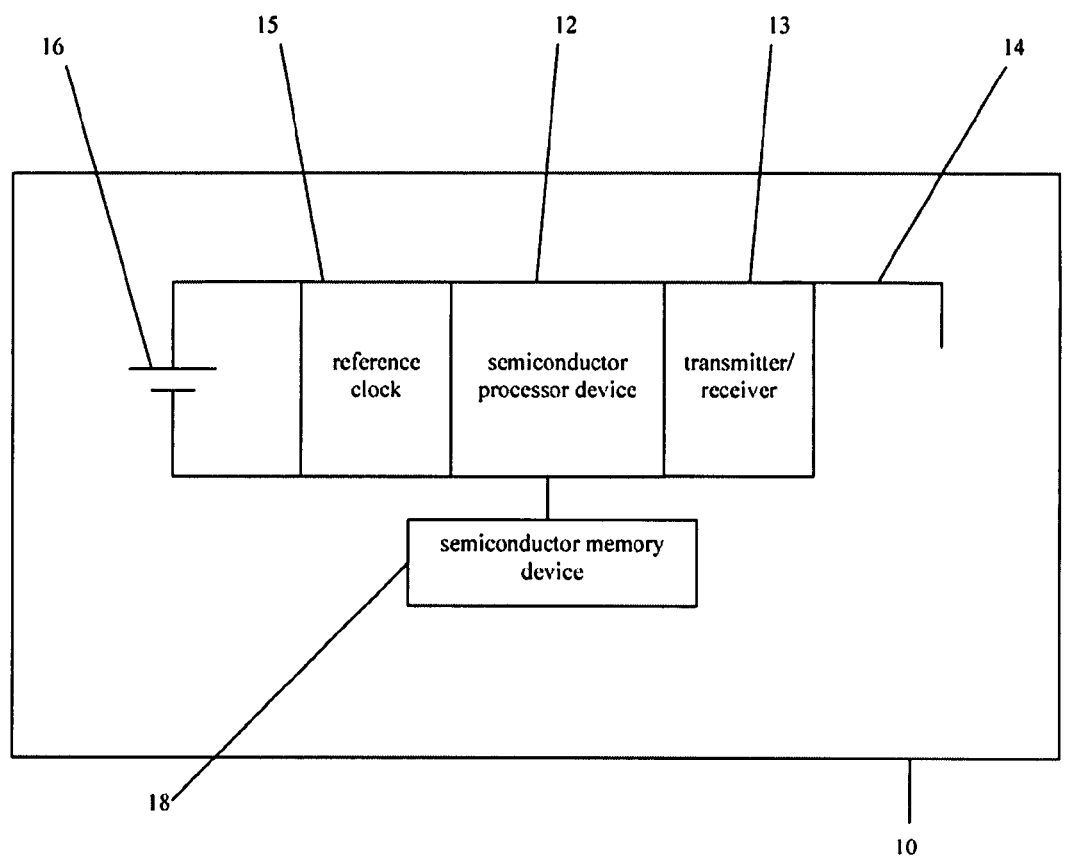
FIG. 1 is a schematic view of a preferred form of device according to one aspect of the present invention.

To first refer to FIG. 1, there is shown a preferred form of device 10. The device 10 may be an identity device, security device, or other similar device, worn or carried by a user. The device 10 has embedded in it a semiconductor processor device 12 that is powered by a battery 16. A suitable transmitter/receiver 13 with an antenna 14 is used to pass data to semiconductor processor device 12, and to send data from semiconductor processor device 12.

A semiconductor memory device 18 is also provided to store data received by semiconductor processor device 12. A reference clock 15 is used so that each received identity will be tagged with the date and time of receipt Semiconductor memory 18 may be a separate semiconductor device (as shown) or may be integral with semiconductor processor device 12. The memory 18 may include temporary memory and permanent memory. The memory 18 preferably uses a first-in-first-out logic. The clock 15 may be integral with semiconductor processor 12, or may be separate.

Figure 2:
FIG. 2 is an illustration of a close contact situation.
Figure 3:
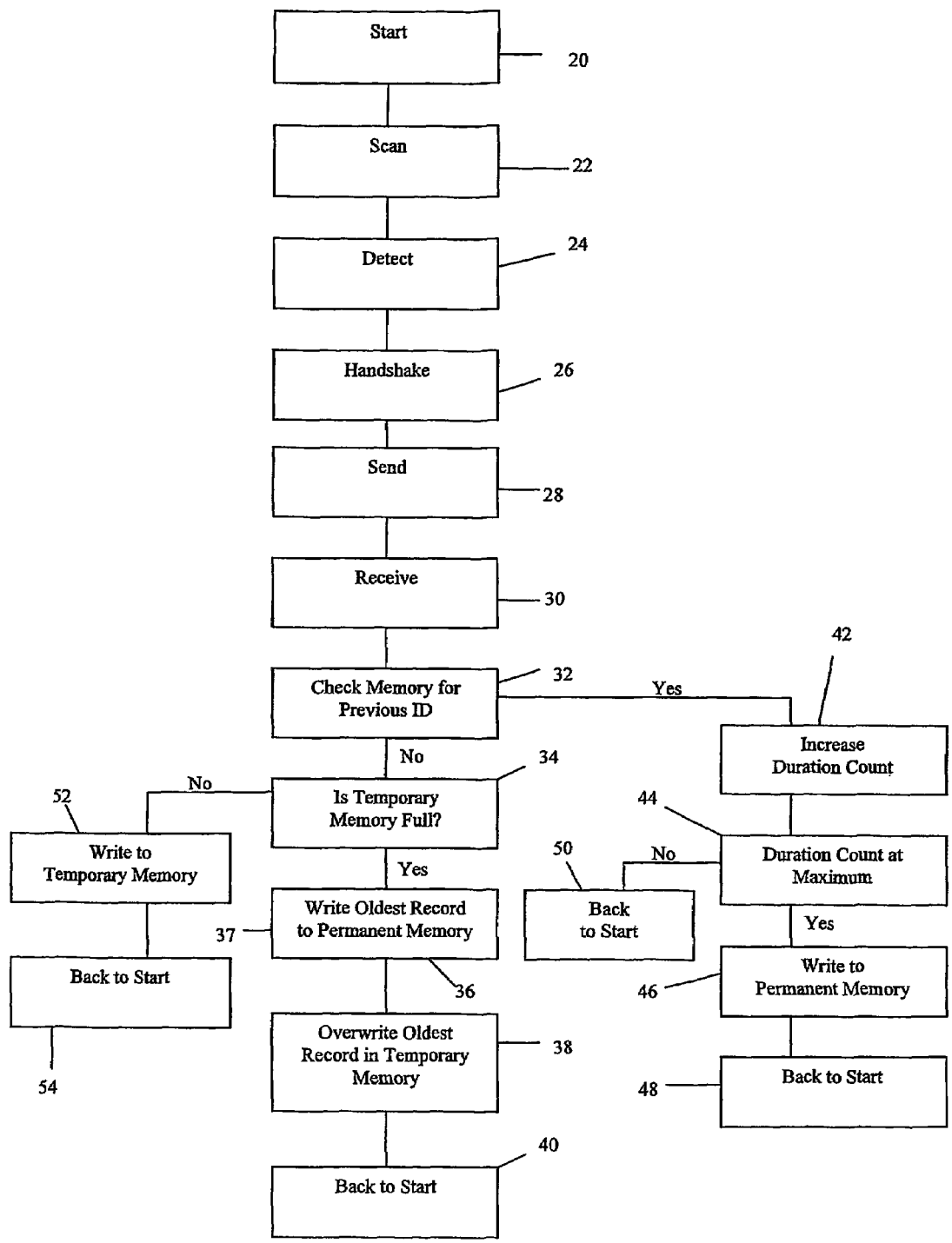
FIG. 3 is a flow chart of a preferred method according to another aspect of the present invention.

To refer to FIGS. 2 and 3, the process is illustrated. Here the device 10 is being worn by a first user 8. As the semiconductor 12 is powered by battery 16, it constantly sends a signal 20 querying if there are any devices similar to device 10 within close proximity. The signal (and all other transmissions/receptions) is a radio frequency signal of relatively low strength so it has a useful range of a few meters only. The signal strength may be adjustable according to the particular requirements. The range may be, for example, two or three meters. The range is preferably matched to the closeness of proximity required for the disease being tracked so that the transmission range of device 10 is not less than the transmission range of the disease. In the case of SARS the transmission range of the disease is two or three meters. If the disease needs physical contact, the disease transmission range may be less than two meters. If the disease has a transmission range of four or five meters, the transmission range of device 10 is preferably at least five meters.

Until another device 6 worn by a second user 4 is within transmission range of device 10, device 10 is in a start or standby mode 20. When another device 6, worn by the second user 4, and similar to device 10, is within the transmission range of device 10, the device 6 will receive the query signal at 22, and will initiate a handshake procedure at 26 by sending a response to device 10. This is detected by device 10 at 24, and the handshake procedure 26 follows. The handshake procedure 26 may be required to ensure that when there are more than two devices 10, 6 in close contact with each other, each of the devices 10, 6 will be able to send its identity to each other device in a controlled manner, and will receive the identity of each other device in a coordinated manner. Therefore, when more than two devices are together, all the devices will be able to exchange and store the identity of each other device.

Upon completion of the handshake procedure 26, device 10 sends at 28 its identity details to the device 6, and the device 6 sends its identity details to device 10. The identity details of device 10 are received by device 6 at step 30, and processed by its semiconductor device 12. The first part of the process is for device 10 to determine at 32 of it has previously come into close contact with device 6, and if the details of device 6 are in the memory 18 of device 10. If not, at 34 the device 10 determines if its temporary memory is full. If it is, in 36 it writes the oldest record in the temporary memory to the permanent memory to thus free some of temporary memory. The oldest record in the temporary memory is then overwritten with the new data in step 38, and device 10 reverts back to the start 20. The date and time stamps are stored with the identity details. The duration of the close contact may also be determined. This may be by determining when contact is discontinued and recording the difference between "start contact" and "end contact", in either real time or system clock counts.

If the result in step 32 is yes, the duration count is increased in step 42. In step 44, the system determines if the duration count is at a maximum. If not, in 50 it reverts back to the start 20; but if it is the data is written to the permanent memory in 46, and in 48 reverts back to start 22.

If in step 34 the temporary memory is not full, the data is written to the temporary memory in step 52; and in step 54 the process reverts back to the start 22.

As each disease has a known incubation period, any symptoms of the disease should be revealed within a predetermined time. The predetermined time should not be less than the known incubation period. Therefore, data relating to any close contact needs to be retained for at least the predetermined time. In the case of SARS, for example, the normal incubation period is ten days. Allowing for possible variations due to individual physiology, extent of exposure, and so forth, the predetermined time should be a little longer than the known incubation period. For an incubation period of ten days (SARS), the predetermined time should be about fourteen days.

If the earlier close contact recorded in the memory is very recent, it may discard the new identity as well as its date and time stamp and duration. By very recent it is meant to cover situations where the same people are working together continuously in relatively close contact for extended periods such as, for example, medical staff in an operating room. By avoiding repeated entries, battery power and memory may be saved.

A time limit may be applied such that if the memory (both permanent and temporary) is full yet the oldest data recorded is less than the predetermined time, the device will stop recording data and provide a warning to the wearer that a download is required to free memory for more data. The warning may be linked to a low battery level warning. Additionally or alternatively, if the contents of memory 18 are downloaded and saved in a separate data management system/computer, any downloaded data may be overwritten.

If person 8 shows symptoms of the disease being tracked, their device 10 can be obtained and all data stored in memory 18 can be downloaded. By using a lookup table of device identifiers and the person to whom the device had been issued, all persons who had been in close contact with person 8, over at least the predetermined time, can be obtained. Those persons can then be contacted. Downloading may erase data stored in memory 18, or may that data to be overwritten.

In a controlled environment such as, for example, a hospital, educational institution, military base, office building, and so forth, it is possible to ensure that all persons who enter the environment are issued with a device 10. For permanent staff, the device 10 may be, or be part of, their normal identity/security/pass device. Casual workers or visitors may be issued a device 10 on a temporary basis with the device issued being tracked according to the identity of the person, time and date. Tracking may also be by location.

The identity of the person may be linked using an identity device such as, for example, identity card number, passport number, social security number, employment pass number, or the like. Preferably, the identity device, passport, or the like has a machine-readable device such as, for example, a bar code to facilitate speedy processing.

If tracking by location, it may be by one or more of building, annexe, floor number, a room number, a corridor number, and a lift number. Therefore, if a location such as, for example, a lift, building, annexe, floor, corridor, or room is installed with a device so that when a person with a similar device enters the location, the device will exchange identity with the similar device. This enables the tracking of persons by location to be able to determine problems due to contamination of the air or a surface in the location.

The controlled environment may have proximity readers for automatically reading and downloading all data from the memory whenever the device 10 is in close proximity to the reader. The proximity reader may be in an area where staff gather and will be relatively stationary for a sufficient time. This may be, for example, bathrooms, toilets, staff canteens, security entries and exists, and so forth. The proximity reader may be integrated with a re-charger for battery 16. This is useful if the full memory warning described above uses a warning linked to low battery level so the user will immediately recharge their device battery, thus also downloading all data recorded in the memory.

If data is downloaded from the memory 18, it may be tagged as being able to be overwritten even if the predetermined time has not yet expired.

Whilst there has been described in the foregoing description preferred embodiments of the present invention, it will be understood by those skilled in the technology that many variations or modifications in details of design, construction or operation may be made without departing from the present invention.

The present invention extends to all features disclosed, both individual and in all possible permutations and combinations.

The invention claimed is:

1. A device for use in recording incidence and duration of close contact for tracking at least one disease, the device having embedded therein at least one circuit including:
   a semiconductor processor;
   a memory;
   a clock;
   an identifier; and
   a transmitter/receiver with an antenna,
   wherein the transmitter/receiver is for receiving the identifier of at least one other similar device when the device and the at least one other similar device are in close contact, the semiconductor processor being for stamping the received identifier with a received date and a received time, and the memory being for storing the received identifier with its received date and time, and wherein the received identifier and its received date and time are stored in the memory for a predetermined time of not less than an incubation time for the at least one disease.

2. A device as claimed in claim 1, wherein at least two selected from the group consisting of: the semiconductor processor, the memory, the clock and the transmitter/receiver, are integral.

3. A device as claimed in claim 1, wherein the memory device uses a first-in-first-out logic.

4. A device as claimed in claim 1, wherein the duration is determined by recording a start time of the close contact and an end time of the close contact, and determining a difference.

5. A device as claimed in claim 1, wherein the duration is in one of system clock counts, and real time.

6. A device as claimed in claim 1, wherein the received identifier, its received date and time stamp, and the duration are able to be overwritten when the predetermined time has expired and the memory device is full.

7. A device as claimed in claim 6, wherein when data in the memory device is downloaded, the data is able to be overwritten by a newly received identifier, its received date and time, and its duration, or is able to be deleted.

8. A device as claimed in claim 1, wherein close contact is a distance not greater than a transmitting range of the device.

9. A device as claimed in claim 8, wherein the distance is not less than the transmission range of the disease.

10. A device as claimed in claim 1, wherein there is further included a battery to provide power to the at least one circuit.

11. A device as claimed in claim 1, wherein the memory comprises a temporary memory and a permanent memory.

12. A device as claimed in claim 11, wherein data is first written to the temporary memory, and data is only written to the permanent memory when the temporary memory is full.

13. A device as claimed in claim 12, wherein oldest data in the temporary memory is first written to the permanent memory before the oldest data is overwritten.

14. A device as claimed in claim 1, wherein the device comprises at least a part of an item selected from the group consisting of:
   an identity device, a security pass, and a pass card.

15. A method of recording incidence and duration of close contacts for disease control, the method including:
   (a) using a device to transmit identity details of the device to at least one other similar device when the device and the at least one other similar device are in close contact;
   (b) receiving from the at least one other similar device and identifier of the at least one other similar device;
   (c) processing the received identifier by adding to it a date and time of receipt;
   (d) storing in a memory the received identifier together with its date and time of receipt until the memory is full, whereupon it is able to be overwritten by a newly received identifier together with its date and time of receipt; and
   (e) downloading and using the stored received identifiers together with their date and time of receipt to determine identities of persons with whom close contact had been made, wherein the received identifier and its date and time of receipt are stored in the memory for at least a predetermined time, the predetermined time being not less than an incubation time for the disease.

16. A method as claimed in claim 15, wherein the device has embedded therein at least one circuit including:
   a semiconductor processor device;
   the memory;
   a clock;
   a transmitter/receiver and an antenna; and
   the identity.

17. A method as claimed in claim 15, wherein the memory uses a first-in-first-out logic.

18. A method as claimed in claim 15, wherein close contact is a distance not less than a transmission range of the disease.

19. A method as claimed in claim 18, wherein the device has transmission range not less than the transmission range of the disease.

20. A method as claimed in claim 15, wherein the device comprises at least a part of an item selected from the group consisting of:
   an identity device, a security pass, and a pass card.

21. A method as claimed in claim 15, wherein the device is issued to a person on a temporary basis for the duration of a stay of the person in a controlled environment, the device being tracked by reference to an identity of the person, time and date.

22. A method as claimed in claim 20, wherein the device is also tracked by reference to a location.

23. A method as claimed in claim 22, wherein the location is one or more selected from the group consisting of: building, annexe, floor number, a room number, a corridor number, and a lift number.

24. A method as claimed in claim 21, wherein the controlled environment is one or more selected from the group consisting of: a hospital, an educational institution, an office building, and a military base.

25. A method as claimed in claim 21, wherein the tracking is by reference to an identifier of the person, the identifier being one or more selected from the group consisting of: identity card number, passport number, social security number, and employment pass number.

26. A method as claimed in claim 21, wherein the controlled environment has at least one reader for downloading the stored identifiers and their date and time of receipt.

27. A method as claimed in claim 26, wherein the at least one reader is associated with a battery charger for the device.

28. A method as claimed in claim 15, wherein the duration of close contact is a time the device and the at least one other similar device are in transmission range.

29. A method as claimed in claim 15, wherein the duration is determined by recording a start of the close contact and an end of the close contact, and determining the difference.

30. A method as claimed in claim 15, wherein the duration is in one of system clock counts and real time.

31. A method as claimed in claim 15, wherein if a person shows symptoms of the disease, all identifiers and their date and time of receipt stored in the memory of the device of that person is downloaded and a lookup table of device identifiers and the persons to whom the device had been issued is used to determine all persons who had been in close contact with the person over at least the predetermined time.

32. A method as claimed in claim 15, wherein prior to step (a) there is performed a preliminary procedure when the at least one other similar device is within a transmission range of the device, the at least one other similar device will receive a query signal from the device and will initiate a handshake procedure to ensure that when there are more than one at least one other similar devices in close contact with the device, each of the devices and the at least one other similar devices will be able to send its identity to each other in a controlled manner, and will receive the identity of each other in a co-ordinated manner.

33. A method as claimed in claim 15, wherein between process steps (b) and (c) the received identifiers stored in memory are first checked to determine if the received identity has been stored within the predetermined time and, if yes, the new date and time stamp are added to data already recorded in the memory for that identity.

34. A method as claimed in claim 33, where if the earlier close contact recorded in the memory is very recent, the new identity as well as its date and time stamp, and duration, is discarded.

35. A method as claimed in claim 29, wherein if the memory is full yet the oldest data recorded is less than the predetermined time, the device will stop recording data and provide a warning to the wearer that a download is required to free memory for more data.

36. A method as claimed in claim 35, wherein the warning is linked to a low battery level warning.

37. A method as claimed in claim 15, wherein the memory comprises a temporary memory and a permanent memory.

38. A method as claimed in claim 37, wherein data is first written to the temporary memory, and data is only written to the permanent memory when the temporary memory is full.

39. A method as claimed in claim 38, wherein oldest data in the temporary memory is first written to the permanent memory before the oldest data is overwritten.

40. A method as claimed in claim 31, wherein downloading is by wireless transmission.

41. A device for use in performing the method of claim 15.

42. A software arrangement that is operable on a processor, the software arrangement comprising a computer program code that configures the processor to perform one or more functions as claimed in claim 15.

* * * * *